United States Patent [19]

Musil et al.

[11] Patent Number: 4,933,853
[45] Date of Patent: Jun. 12, 1990

[54] ULTRASONIC GRADE AND AUGER CONTROL

[75] Inventors: Joseph E. Musil, Ely, Iowa; Joseph R. Adamski, Sudbury, Mass.; Christopher Ferguson, Framingham, Mass.; J. Scott Petty, Hanover, Mass.

[73] Assignee: Raytheon Company, Lexington, Mass.

[21] Appl. No.: 251,141

[22] Filed: Sep. 28, 1988

[51] Int. Cl.⁵ .............................................. E01C 19/00
[52] U.S. Cl. ........................ 364/424.07; 37/DIG. 20; 37/DIG. 1
[58] Field of Search ................... 364/424.01, 424.05, 364/424.07, 561; 340/612; 56/10.2, DIG. 15; 37/DIG. 18, DIG. 20, DIG. 1; 73/861.18

[56] References Cited

U.S. PATENT DOCUMENTS

| | | | |
|---|---|---|---|
| 4,197,032 | 4/1980 | Miller | 404/98 |
| 4,561,064 | 12/1985 | Bruggen et al. | 364/561 |
| 4,573,124 | 2/1986 | Seiferling | 364/424.07 |
| 4,663,712 | 5/1987 | Kishida | 364/424.07 |
| 4,733,355 | 3/1988 | Davidson et al. | 364/424.07 |
| 4,807,131 | 2/1989 | Clegg | 364/424.01 |
| 4,823,366 | 4/1989 | Williams | 377/2 |

OTHER PUBLICATIONS

"Ultrasonic Instrumentation"; Ocean Motions Company; 1986.
"Linear Circuits Data Book; Texas Instruments; Sonar Ranging Module, Type SN28827; pp. 5-43 to 47; 1984".
"Blaw-Knox Construction Equipment Corp.; Mattoon, Ill.; 1987".
"Agtek; Blade Control System; Livermore, Calif.".
"Equipment Operation & Maint. Instr.; Cedarapids; Manual #IMCO-092; Duo-Matic II, Electric Screed Control System".
"Proportional Feed, Current System O & M; Cedarapids; IMCO-189-6-85; Asphalt Feed System".
"Ultrasonic Ranging System; Polaroid; 2/84".
"Ultrasonic Ranging System Handbook; Polaroid".

Primary Examiner—Thomas G. Black
Attorney, Agent, or Firm—Steven C. Stewart; William R. Clark; Richard M. Sharkansky

[57] ABSTRACT

An ultrasonic grade and auger control for use on a road paving machine to compensate for uneven road surfaces is described. As the road paving machine travels, asphalt is centrally deposited along the road bed. An auger is connected to the back of the road paving machine and contains a series of spiral blades which moves the asphalt away from the center of the road bed toward its outer edges. The ultrasonic auger control apparatus detects the height of the asphalt positioned at the outer edges of the paving machine and regulates the speed of the auger to provide even distribution of the asphalt. A screed is located behind the auger to uniformly place and pack the paving material. The ultrasonic grade control apparatus regulates hydraulic actuators which control the thickness of the new road surface by adjusting the height of the screed.

35 Claims, 9 Drawing Sheets

ULTRASONIC GRADE AND AUGER CONTROL

BACKGROUND OF THE INVENTION

This invention relates generally to road construction and asphalt paving machines, and relates more particularly to non-contacting sensing and control devices for controlling the position of a grading implement relative to a datum. Further, this invention particularly relates to controlling the rotational velocity of an auger and the position of a gate to a hopper relative to the profile of asphalt on the ground.

As described in U.S. Pat. No. 4,733,359, motor graders, bulldozers, pavers and other road construction earth moving vehicles have been used for controlling the position of a grading implement relative to a datum. The grading implement of these vehicles are usually positioned by hydraulic cylinders that are coupled to mechanisms that support the grading implements. As the paving machine moves along the road bed, a mechanical sensing device or range sensing device senses the position of the datum relative to the implement, and a control device then signals the hydraulic cylinders to reposition the implement accordingly.

As is known in the art, an implement used with a paving machine to level the asphalt is a screed. The screed is positioned by a hydraulic cylinder responding to a signal from a control and sensing device. Two types of sensing devices for adjusting the position of a screed include a contacting wand and a non-contacting sonic sensor. The wand drags along the ground and swings upward or downward depending on the level of the datum. This wand may go off the line of the datum and also may become jammed. An improvement to the contacting wand is a non-contacting sonic device as described in U.S. Pat. No. 4,733,355. The non-contacting sonic device has been found to be more reliable than the contacting sensing device as there are few movable parts and is less susceptible to errors due to mechanical failures.

Sonic devices have a reference wire located a known fixed distance down from the sonic sensor. The sonic sensor transmits a sonic signal which reflects from the reference wire. This time between transmission and receipt of the sonic signal from the reference wire is used to adjust the position of the screed.

When using a non-contacting sonar device with a reference wire, it is possible to have a screed that levels pavement to a target level with an accuracy of less than one-tenth of an inch. Consequently, the screed placement is more precise, resulting in instantaneous screed movement which may cause small ripples in the road surface. It is therefore necessary to have a screed that travels along the road that provides a smooth road surface without ripples. Another drawback of the non-contacting sonic device with a reference wire is that during operation as air temperature varies, the screed position also varies. This may lead to the position of the screed deviating from the target level which may result in an uneven road surface. A third drawback of using a more accurate sonic sensor is that due to the instantaneous response to the changes in the road condition, the screed is apt to move up or down and miss the target level. A fourth drawback is that the sonic device may cause the screed to position itself in response to detection of a pot hole.

When using a paving machine, the asphalt is typically deposited into a hopper from which the asphalt is carried on a conveyer belt to the back of the paving machine. The asphalt then exits through the back of a paving machine into the center of an auger. The auger rotates and distributes the asphalt uniformly to the sides of the road bank where the asphalt is then flattened by the screed.

The auger typically runs at a variable rate or alternately may rotate at a fixed speed. The speed of the auger is controlled by a wand or sonic sensor device that resides near the outer ends of the auger. The wand senses the height of the asphalt by rotating upward as the asphalt level gets higher. The sonic sensor device senses the height of the asphalt by transmitting a sonic signal and noting the reflection time. The wand and sonic sensor device are connected to a potentiometer which changes its resistance as the wand extends outward or the reflection time becomes lower in response to a rise in the level of the asphalt. This resistance change causes the speed of the auger to change, resulting in an even level of asphalt being distributed laterally by the auger.

A first drawback of the mechanical control wand is that the arm resides in the asphalt and accordingly, asphalt sticks to the wand, thereby changing its center of gravity. This change of wand center of gravity may cause the arm to be stuck at a particular angle, thereby clogging and resulting in an inaccurate auger speed. This inaccurate speed results in the asphalt being distributed unevenly to the screed resulting in a build-up or a depletion of asphalt along the sides of the road bed. Further, because the arm is mechanical, the auger control does not respond to a change in the auger height at a fast enough rate, compounding the unevenness of the pavement to the screed. A second drawback of the mechanical wand and auger sonic sensor is that they may cause the auger rotational speed to fluctuate continuously because the height of of the asphalt within the auger is uneven. This unevenness results in a separation in the pavement material and a poor quality road. A third drawback to using a mechanical wand and an auger sonic sensor is that an inaccurate auger speed may result due to improper placement of the wand or the sonic sensor. A fourth drawback is that the auger may break down and jam due to continuous contact with the pavement material.

A paving device typically has a hopper gate to control the flow of the asphalt being distributed to the auger. This gate is currently regulated manually by the operator. The height of the hopper gate is important, as it further controls the amount of asphalt being distributed to the auger. When too much asphalt is delivered to the auger, a peak will form in the center of the paving machine, causing an uneven flow to the screed. If the gate is lowered, resulting in too little asphalt being distributed to the auger, the result is a trough in the center of the paving machine and excess asphalt being delivered to the screed along the sides of the road bed. To correct this problem, the operator must manually adjust the gate height; however, this still results in inaccuracies along the road bed, as the operator is not always able to react to changing road conditions.

A further drawback of using a wand or sonic device as screed sensing devices is that substantial time is required for set up and adjustment. Typically, a wand or sonic sensor is positioned on the paving machine at a predetermined height above the ground relative to the target level that the grader is to be positioned above the ground. Often between days of operation, these sensor devices are moved or bumped. Accordingly, the following day these control devices must be checked and reset again. Further, in operation, it is often required to change the height of the asphalt relative to the level of the grader, thereby requiring that the sensing device be moved to another position.

SUMMARY OF THE INVENTION

It is an object of this invention to provide an improved paving device.

It is another object to provide an improved auger control device.

It is also an object to provide an improved screed control device.

It is another object to provide an auger control that has an instantaneous response to the height of asphalt deposited onto the ground.

It is also an object to provide an auger that prevents separation of paving material.

An additional object is to provide an auger control device that does not clog up with asphalt.

It is also an object to provide an asphalt distribution system that has an even material profile.

It is also an object to provide a screed control system that has accurate screed placement.

It is further an object to provide a screed control device that compensates for variation in temperature.

It is also an object to provide a screed control device that prevents road ripples.

It is also an object to provide a screed control device that prevents the screed from oscillating into and out of a target region.

It is an additional object to provide a screed control device that compensates for uneven road surfaces.

It is further an object to provide a control device that allows a quick and easy set up.

It is an additional object to provide a control device that has the capability for remote adjustment.

It is also an object to provide a control and sensing device that adjusts the asphalt flow to compensate for uneven material profiles on the road bed.

These and other objects of the invention are obtained generally by providing an asphalt paver comprising an auger for moving asphalt laterally in a direction perpendicular to the direction of the paver. Also provided is a sonic means coupled to the paver for periodically transmitting a sonic signal downwardly towards a first location on the asphalt in the auger and for receiving a reflection of the sonic signal from the first location on the asphalt. Further provided is means for measuring the time period between transmitting and receiving the sonic signal, the measured time period corresponding to the distance from the sonic means to the asphalt. The asphalt paver further comprises means for determining a mean time period corresponding to the average of a plurality of measured time periods and means responsive to the mean time period for varying the rotational speed of the auger. It may be preferable that the asphalt paver further comprise means for defining a preset time interval corresponding to the time period between transmitting and receiving the sonic signal when the asphalt is at a preset level. It may also be preferable that the responsive means increases the rotational speed as the mean time period decreases and decreases the rotational speed as the mean time period increases. It may further be preferable that the sonic means periodically transmits a second sonic signal towards a second location adjacent the first location on the asphalt and receives a second sonic signal reflected upward from the second location, wherein the time period between transmission and receipt of the second sonic signal defines a second measured time period that is proportional to the separation distance between the sonic means and the second location on the asphalt. It may additionally be preferable that the paver comprise means for generating a hopper adjustment signal related to the magnitude of the difference between the measured time period and the second measured time period, and means responsive to the hopper adjustment signal for adjusting the height of a hopper located on the paving machine.

The invention may further be practiced by an apparatus for controlling the rate of flow of asphalt of a paving machine relative to the height that the delivered asphalt's level extends above a preset level located above the ground comprising sonic means coupled to the implement for periodically transmitting a first and second sonic signal downward towards a respective first and second location position on the asphalt, and for receiving a first and second signal reflected upward from the asphalt, wherein the time period between transmission and receipt of the first sonic signal defines a first distance time period that is proportional to the separation distance between the sonic means and the first location, and wherein the time period between transmission and receipt of the sonic signal defines a second distance time period that is proportional to the separation distance between the sonic means and the second location. The apparatus further comprises means for defining a preset time period corresponding to the time period between transmission and receipt of a sonic signal when the asphalt level is equal to the preset level. The apparatus also comprises means for generating no flow signals if the magnitude of the difference between the first and second distance time period is less than a preset time period, for generating a positive flow signal at the magnitude of the difference between the first and second distance time period is positive and has a magnitude greater than the preset time period, and for generating a negative flow signal or the magnitude of the difference between the first and second time periods is negative and has a magnitude greater than said preset time period, and delivery ray adjustment means coupled to the asphalt paving machine for increasing the amount of asphalt flow in response to a positive flow signal and for decreasing the amount of asphalt flow in response to a negative flow signal.

The invention may further be practiced by an apparatus for controlling the position of the grading implement relative to a datum alongside a road bed comprising sonic means coupled to the grading implement and responsive to changes in the air temperature for determining the distance between the grading implement and the datum. The apparatus also comprises means in electrical contact with the sonic means for generating a direction signal relative to the distance, and means for moving the position of the grading implement at a rate so as to smooth the road bed in response to the direction signal.

The invention may further be practiced by an apparatus for controlling the position of a grading implement of a paving machine at a predetermined distance above a datum disposed alongside a road bed, where the apparatus comprises sonic means coupled to the grading implement for periodically transmitting a sonic signal downward toward the datum and receiving a sonic signal reflected upward from the datum, when a duration of a time period between transmission and receipt of the sonic signal defines a second time period that is proportional to the distance between the sonic means and the datum. The reference point means is disposed a predetermined fixed distance downward from the sonic means and reflects the sonic signal from the sonic transmitting means to the sonic receiving means. The apparatus further comprises timing means for defining a first time period between transmission and receipt of the sonic signal from said reference point means. Also provided is adjustment means for determining a measurement distance corresponding to the distance between the sonic means and the datum, where the measurement distance is calculated at a predetermined relationship between the first time period, the predetermined distance, and the second time period. Also provided is a comparison means for generating a direction signal if the duration of the measurement distance falls within a predetermined distance interval and position adjustment means coupled to the grading implement for moving the implement relative to the ground in response to the direction signal in such a manner as to slow the movement of the grading implement, thereby preventing ripples in the road bed. It may be preferable that the predetermined relationship equals ((first time period)*(predetermined distance))/ (second time period).

DETAILED DESCRIPTION OF THE PREFERRED EMBODIMENTS

Figure 1:
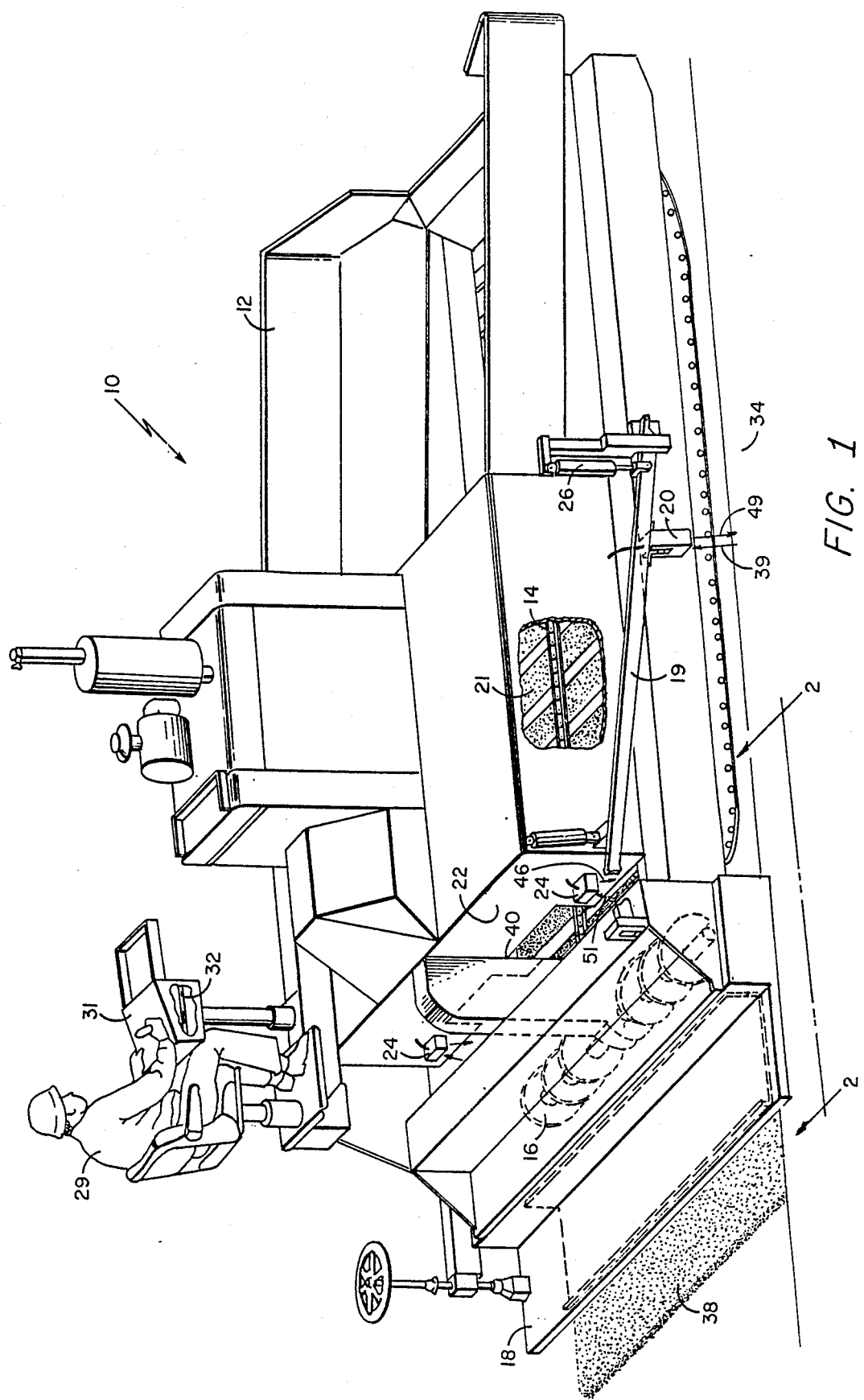
FIG. 1 is a perspective view of an asphalt paving machine having an auger and grader range sensing and control device installed thereon.

Referring to FIG. 1, there is shown a paving machine 10 having a hopper 12, conveyer 14, auger 16, screed or grading implement 18, and mechanism 19. Asphalt 21 is deposited within the hopper 12 located on the front of paving machine 10. Beneath hopper 12 is conveyer 14 that delivers asphalt 21 to the back of paving machine 10. Behind conveyer 14 and connected to paving machine 10 is auger or spreading implement 16. Disposed behind auger 16 is grading implement 18. Mechanism 19 is connected to paving machine 10 and screed 18. Mechanism 19 supports grading implement 18.

Figure 3:
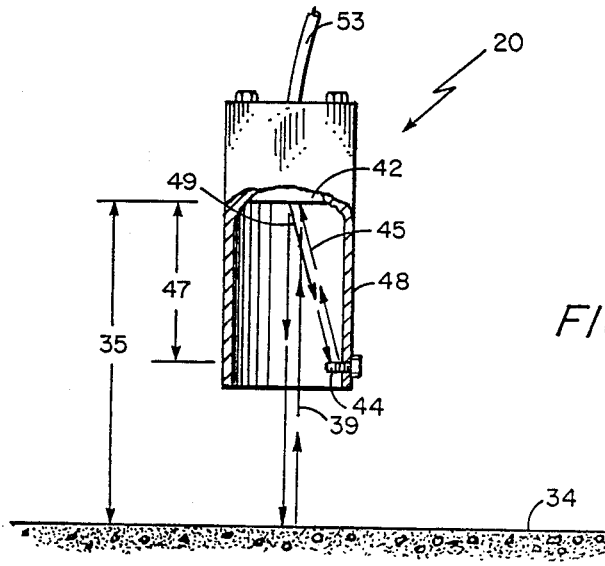
FIG. 3 is a partially cut-away view of the grader sensor device shown in FIG. 1.

Mounted on a mechanism 19, disposed on the right side of paving machine 10, is screed sensor 20 having an internal transducer 42 (FIG. 3). Behind conveyer 14 is back panel 22, on which an auger sonic sensor 24 is mounted. Also mounted to paving machine 10 is hydraulic cylinder 26 that is coupled to mechanism 19. Located on top of paving machine 10 is control circuitry 32 that transmits a signal to hydraulic cylinder 26 to reposition the mechanism 19 and grading implement 18.

A similar mechanism with a screed sensor may be mounted on the left side of paving machine 10 to more accurately level grading implement 18. The sonic grader control will be described using the mechanism 19 and screed sensor 20 on the right side of paving machine 10.

Disposed on top of paving machine 10 near operator 29 is control panel 31 and control circuitry 32. Control panel 31 has operator input switches (not shown) which include an up switch, down switch and null switch to signal a direction of movement to mechanism 19 and auger control mechanism. Control circuitry 32 is located under control panel 31. Control circuitry 32 governs the operation of the grading implement 18 and auger 16.

Along the side of the road is datum 34. Datum 34 may be a curb, stringline, or other reference point that the asphalt level is to match.

In operation, asphalt is dumped into hopper 12 where the asphalt is then moved with conveyer 14 to the back part of paving machine 10. The asphalt 36 (FIG. 2) then falls through a slit 40 in back panel 22 and down onto auger 16.

Screed sensor 20 signals control circuitry 32 to change the position of grading implement 18 in response to changes in the distance between screed sensor 20 and datum 34, i.e. measurement distance 35 (FIG. 3). Auger sonic sensor 24 signals control circuitry 32 to change the rotational velocity of auger 16 in response to changes in distance 37 (FIG. 2) between auger sonic sensor 24 and asphalt 36.

Figure 2:
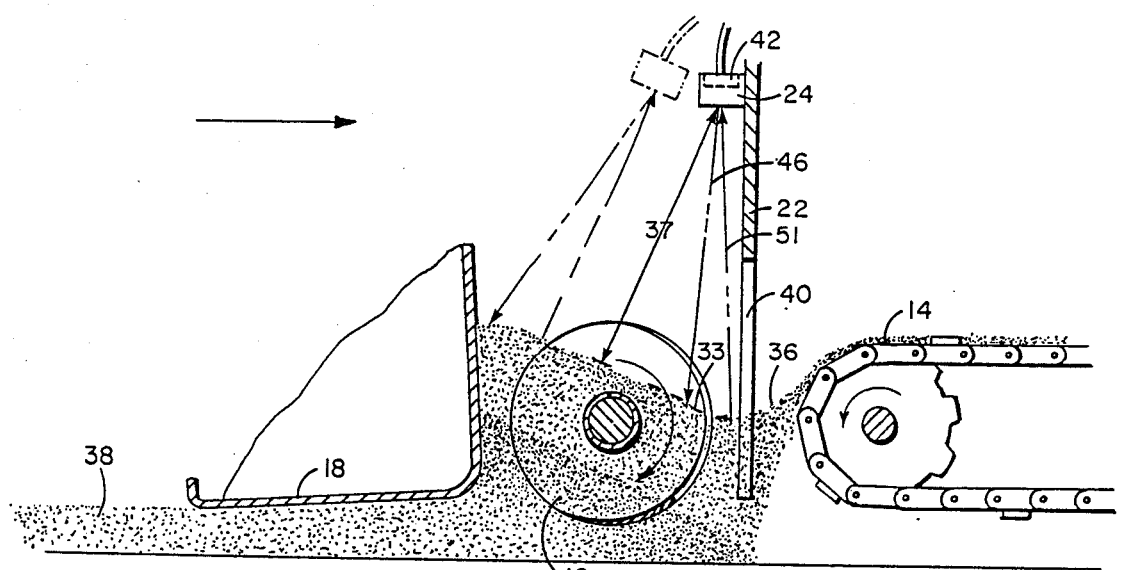
FIG. 2 is a side view of a portion of the paving machine showing an auger, screed and conveyer belt, along line 2—2 in FIG. 1.

Referring to FIG. 2, there is shown a side view of auger sonic sensor 24 mounted on back panel 22 with auger 16, conveyer 14, asphalt 36 and screed 18. Auger sonic sensor 24 is mounted approximately 24 inches above asphalt 36 and aims sonic signal behind or in front of auger 16.

During auger 16 operation, when the asphalt 36 falls from conveyer 14, an auger control mechanism turns auger 16 to distribute the asphalt 36 to the sides of the road bed 38. The asphalt 36 then flows through the screed 18 where it is flattened to form a smooth road surface.

Referring to FIG. 1, as the paving machine 10 moves along the road, it is desirable to have the top surface of road bed 38 at a fixed level with respect to the datum 34. As the paving machine 10 travels along the road bed 38, the height of datum 34 is sampled at a rate of 30 times per second. The control circuitry 32 periodically sends a sonic signal to screed sensor 20 which then transmits sonic signal 49 toward datum 34. The sonic signal 39 then reflects upward from datum 34 to screed sensor 20. Screed sensor 20 then transmits this signal (second reflected sonic signal 39) reflected from datum 34 to control circuitry 32.

Referring to FIG. 3, disposed within screed sensor 20 is a transducer 42 and a reference point or screw 44. Transducer 42 transmits sonic signal 49 downward. Screw 44 protrudes into screed sensor 20 to reflect the sonic signal back to transducer 42 and is located at a predetermined distance 47 (typically 6.0 inches) from transducer 42. The signal reflected from screw 44 (first reflected sonic signal 45) can be used by control circuitry 32 to compensate for changes in air temperature. Further details of this operation will be explained in connection with FIG. 3.

Figure 7:
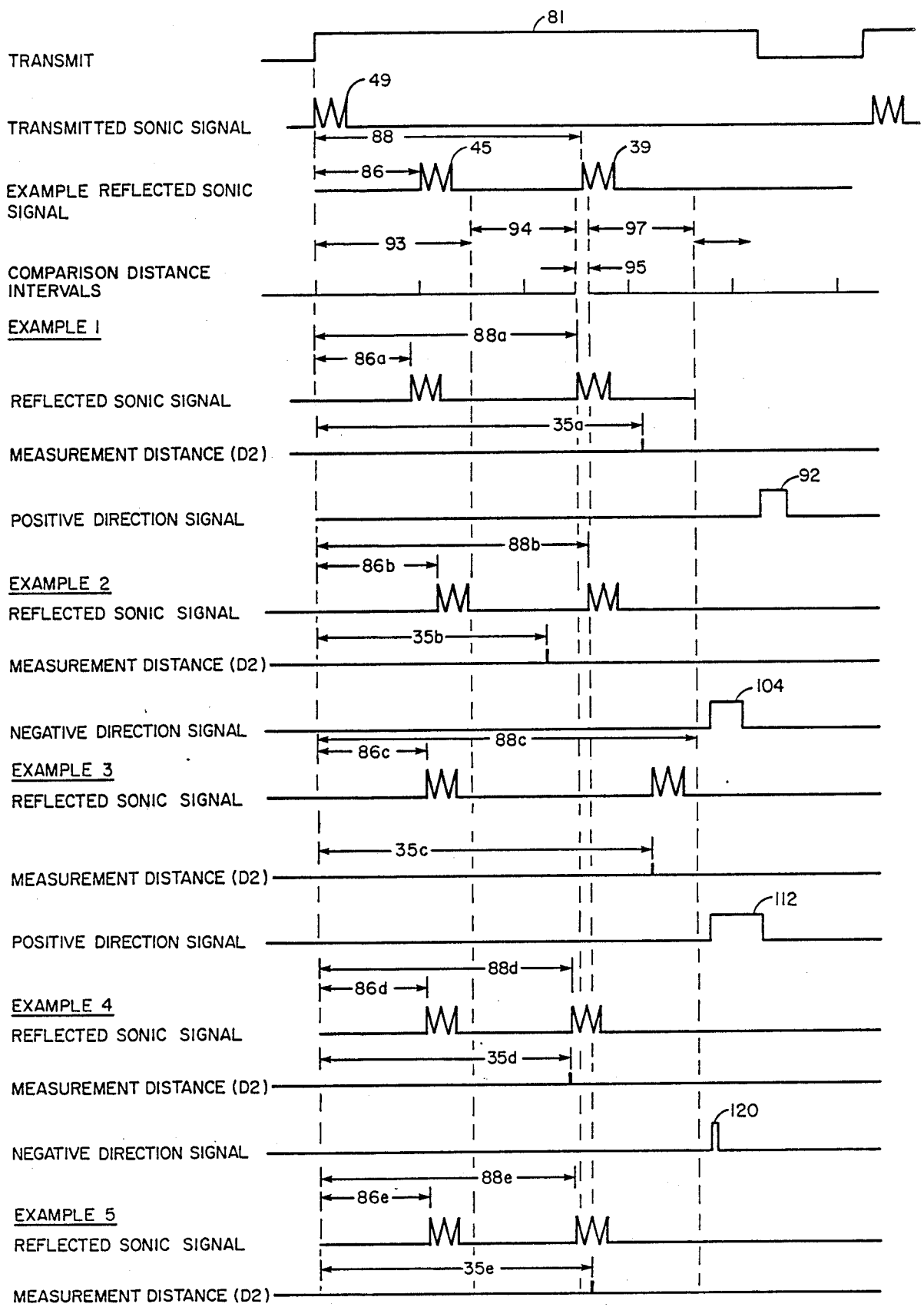
FIG. 7 is a timing diagram for the grader range sensing and control device of FIG. 4.

Referring to FIGS. 1, 3 and 7, within control circuitry 32 are timing circuits which define a series of consecutive distance intervals (94, 95, 97) related to a distance between the transducer 42 and datum 34. The first distance interval 94 corresponds to a positive region where the measurement distance 35 is too high; the second distance interval 95 corresponds to a null or target region where the measurement distance 35 is correct; and the third distance interval 97 corresponds to a negative region where the measurement distance 35 is too low. The first distance interval 94 starts at a programmable distance from datum 34 and ranges from 1'-2'; the second distance interval 95 occurs after the first distance interval 94 ends and ranges from 2.0'-2.01'; and the third distance interval 97 occurs after the second distance interval 95 and ranges from 2.01'-3.0'.

Referring to FIG. 3, control circuitry 32, upon receiving the first reflected sonic signal 45, computes a first time period 86 (FIG. 7) corresponding to the time period between transmission of the sonic signal 49 and receipt by transducer 42 of the reflection of the first reflected sonic signal 45. Control circuitry 32, upon receiving the second reflected sonic signal 39, computes a second time period 88 (FIG. 7) corresponding to the time period between transmission of the sonic signal and reflection of the second reflected sonic signal 39. Control circuitry 32 then calculates a measurement distance 35 by multiplying the first time period 86 by a scaler computed using the second time period 88. More details of this scaler value will be explained later.

Control circuitry 32 transmits a positive or negative direction signal to hydraulic cylinder 26. The direction signal is related to the magnitude of the measurement distance 35 compared to the magnitude of the second distance interval 95. If the measurement distance 35 is greater than the second distance interval 95, control circuitry 32 transmits a pulsed positive direction signal to the hydraulic cylinder 26. If the magnitude of the measurement distance 35 is less than the second distance interval 95, control circuitry 32 transmits a pulsed negative direction signal to hydraulic cylinder 26. If the magnitude of the measurement distance 35 is approximately the same as the magnitude of the second distance interval 95, control circuitry 32 transmits no direction signals to the hydraulic cylinder 26.

Figure 6:
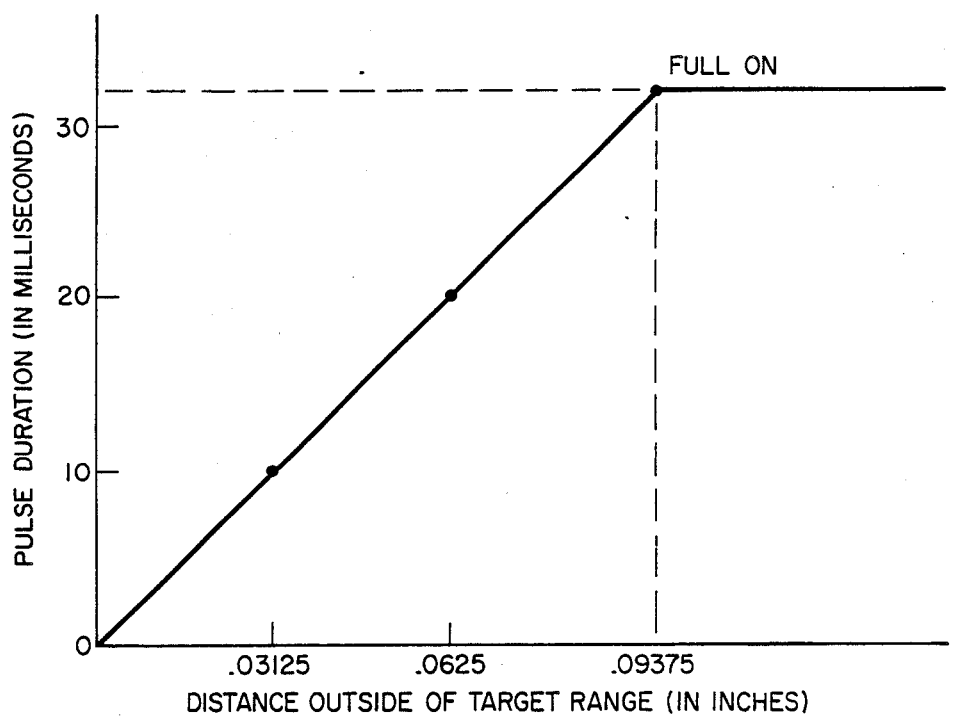
FIG. 6 is a plot of the grader control value pulse width time as a function of the distance from the measurement distance to the target region.

The direction signals has a series of pulses having a width proportional to the distance between the second distance interval 95 and the measurement distance 35, as shown in FIG. 6. The greater the measurement distance 35 is away from the second distance interval 95, the wider the direction signal pulse.

When hydraulic cylinder 26 receives a positive or negative direction signal, screed sensor 20, mechanism 19 and grading implement 18 is moved upwards or downwards. The grading implement 18 and sensor 20 move at a rate proportional to the width of the pulse within the direction signal. For longer pulses, hydraulic cylinder 26 moves grading implement 18 at a faster rate. For short pulses, hydraulic cylinder 26 moves grading implement 18 at a slower rate. By reducing the length of the pulses to hydraulic cylinder 26 as the distance between datum 34 and screed sensor 20 approaches the second distance interval 95, grading implement 18 is prevented from oscillating into and out of the target region.

Referring now to FIGS. 1 and 2, during paving machine 10 operation, the asphalt 36 is delivered to auger 16 from conveyer 14. Control circuitry 32 then transmits a signal to auger sonic sensor 24 which transmits sonic signal 46 downward toward asphalt 36. The sonic signal 46 reflects off of a first location on asphalt 36 and back to auger sonic sensor 24 where the reflected sonic signal 51 is then transmitted to control circuitry 32. The control circuitry 32 then determines a measurement or distance time period 53 (FIG. 8) corresponding to the time period between transmission of sonic signal 46 and receipt of the reflected sonic signal 51. The distance time period 53 inversely proportional to the height of the asphalt 36 above road bed 38. Control circuitry also calculates a mean measurement time period as the running average of the last eight distance time periods 53. Control circuitry 32 defines a preset time period 134 (FIG. 8) which corresponds to the time between transmission of sonic signal 46 and receipt of reflected sonic signal 51 when asphalt 36 level is at preset level 33. Control circuitry 32 defines a reference time interval 132 as a time interval which begins after preset time period 123 and corresponds to the time for a sonic signal to reflect from asphalt 36 when the level of the asphalt is below preset level 33. Control circuitry 32 compares the mean measurement time period to the preset time period 134 (typically 3.52–4.40 ms). Depending on when the mean measurement time period ends with respect to the preset time period 134, the control circuitry 32 sends a control signal to an auger control mechanism (not shown) to speed up or slow down the auger 16.

For example, as the asphalt 36 level rises, the mean measurement time period decreases below the preset time period 134. The reduced mean measurement time period results in control circuitry 32 sending a control signal to auger control mechanism to decrease the rotational velocity of auger 16. On the other hand, as the asphalt 36 level falls below the preset level 33, the mean measurement time period increases. The increased mean measurement time period results in control circuitry 32 sending a control signal to the auger control mechanism to increase the rotational velocity of auger 16.

Referring to FIG. 3, there is shown the inside of the sonic sensor 24, comprising an electrostatic transducer 42, reference point or screw 44 and casing 48. Electrostatic transducer 42 shown is a #8867 electrostatic transducer manufactured by Polaroid, or equivalent. Connected to the wall of casing 48 is screw 44, which is a quarter-inch in diameter and inserted at least one inch into the casing 48. Casing 48 is preferably made from a plastic material with a magnetic backing to attach casing to the side of paving machine 10. Further, casing 48 has a plurality of holes to allow ventilation of air within sonic sensor 20.

Screw 44 is preferably located at least six inches below transducer 42. Further, screw 44 is inserted into casing 48 and its insertion length is adjusted to provide a single reflection of the sonic signal from transducer 42.

During grader operation, sonic sensor 20 receives a sonic signal from control circuitry 32 and transmits sonic signal 49 downward. First, reflected sonic signal 45 reflects back from screw 44 and sonic signal 39 reflects back from datum 34.

Control circuitry 32 then receives reflected first and second sonic signals 39 and 45 (FIG. 7) having a first reflected pulse from screw 44 and a second reflected pulse from datum 34. The time between the transmission of the sonic signal 49 and receipt of first reflected sonic signal 45 pulse defines a first time period 86 that is proportional to the separation distance or predetermined distance 47. The time between transmission of the sonic signal 59 and receipt of second reflected sonic signal 39 pulse defines a second time period 88 that is proportional to measurement distance 35. The first and second reflected sonic signals 45 and 39 are then transmitted down cable (not shown) to control circuitry 32.

Control circuitry 32 receives the second reflected sonic signal 39 and first reflected sonic signal 45 reflected pulses and computes first and second time periods 86 and 88. As the distance between transducer 42 and screw 44 is known and is proportional to the first time period 86, the measurement distance 35 can be calculated using the second time period 88.

Control circuitry 32 calculates the measurement distance 35 by multiplying the magnitude of the second time period 88 be a scaling factor equal to predetermined distance 47 divided by the first time period. The measurement distance 35 is then compared against three consecutive distance intervals 94, 95, 97, wherein the first of these distance intervals 94 defines a positive region, the second distance interval 95 defines a target region, and the third distance interval 97 defines a negative region. More details of these distance intervals will be explained in connection with FIG. 7.

Figure 4:
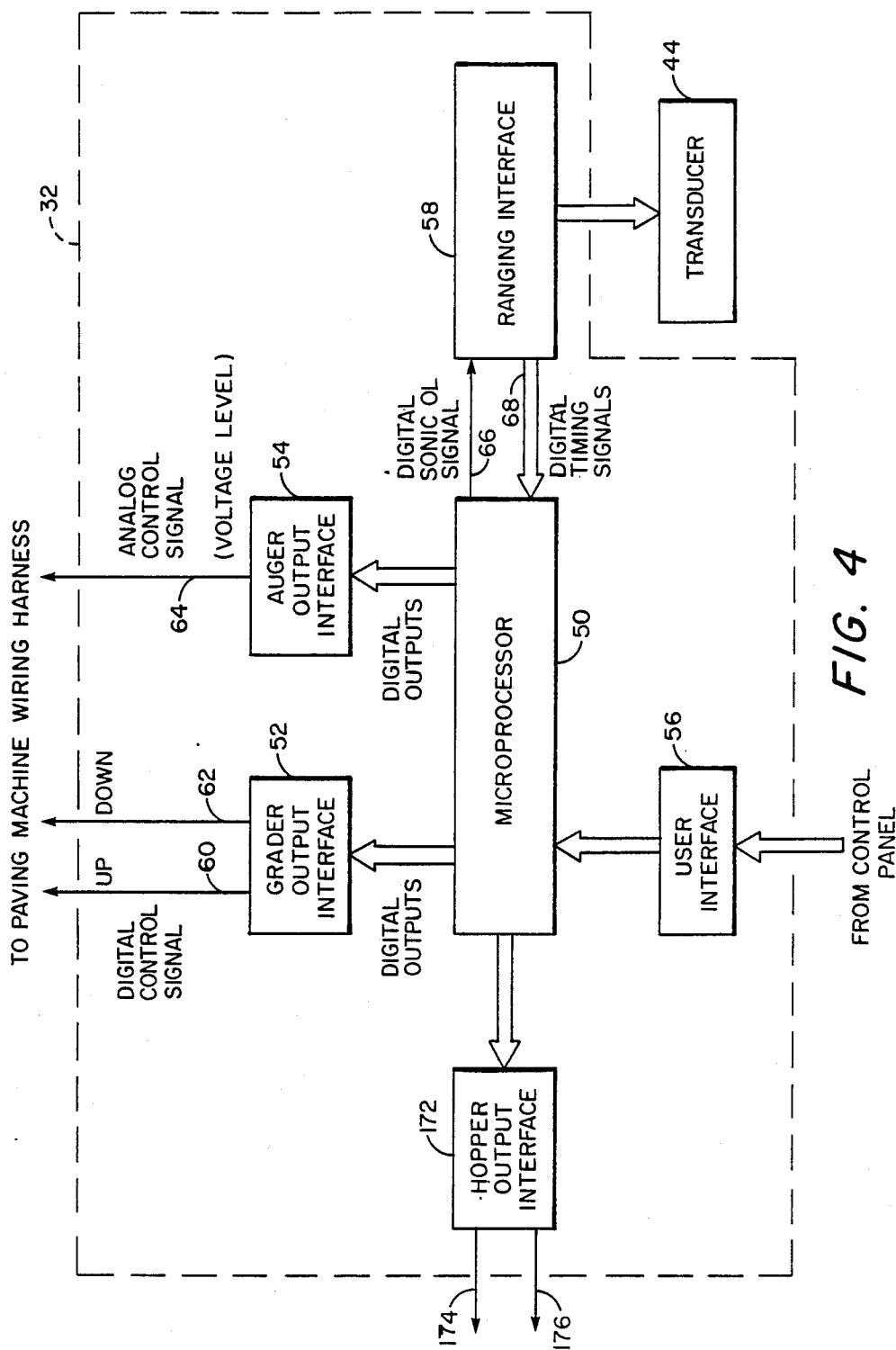
FIG. 4 is a block diagram of a range sensing and control device according to the present invention.

Referring to FIG. 4, there is shown a block diagram of the grader and auger control circuitry 32 having a micro processor 50, grader output interface 52, auger output interface 54, hopper output interface 172, user interface 56, and ranging circuitry 58. Microprocessor 50 contains an internal ROM, RAM, continuously running internal 16-bit counter, capture registers and non-volatile memory (EEPROM). Microprocessor 50 runs the grader or auger control program stored within the internal ROM.

An exemplary microprocessor 50 is a 68HC11 manufactured by Motorola, Inc. The 68HC11 has internal capture registers that store data from grader output interface 52, auger output interface 54, hopper output interface 172, ranging circuitry 58 and user interface 56. The internal capture registers can be programmed to interrupt the microprocessor 50 program. The 68HC11 contains a power on reset line to clear all internal registers, timers and output lines. The 68HC11 also has programmable output lines and an internal programmable 16-bit counter.

Microprocessor 50 communicates with hydraulic cylinder 26 through grader output interface 52. Grader output interface 52 has an up digital control line 60 and down digital control lines 62 to signal the direction of movement to hydraulic cylinder 26.

Also connected to microprocessor 50 is auger output interface 54 which converts the digital output of microprocessor 50 into an analog control signal on line 64.

The voltage level on line 64 fluctuates to regulate the speed of auger 16.

Microprocessor 50 communicates with control panel 31 through user interface 56. The operator 29 sets switches on control panel 31 to recall prestored height configurations and to set the programmable distance 93 (FIG. 7) for the grading implement 18 and the preset time period 134 for the auger 16.

Microprocessor 50 transmits and receives sonic signals to transducer 42 through a ranging interface 58. Microprocessor 50 transmits digital sonic signals on line 66 to ranging circuitry 58. These digital control signals contain trigger and blanking information. Microprocessor 50 receives information from ranging interface 58 on lines 68. This information includes digital timing signals corresponding to measurement distance 35. Ranging circuit 58 includes integrated circuit #SN28827 is manufactured by Texas Instruments, Inc. More detail about IC #SN28827 and its operation is contained in Texas Instruments, Inc. *Linear Circuits Data Book*, 5–43 (1984). Further details of the operation of monitor circuitry 32 will be explained in connection with FIG. 5.

Figure 5:
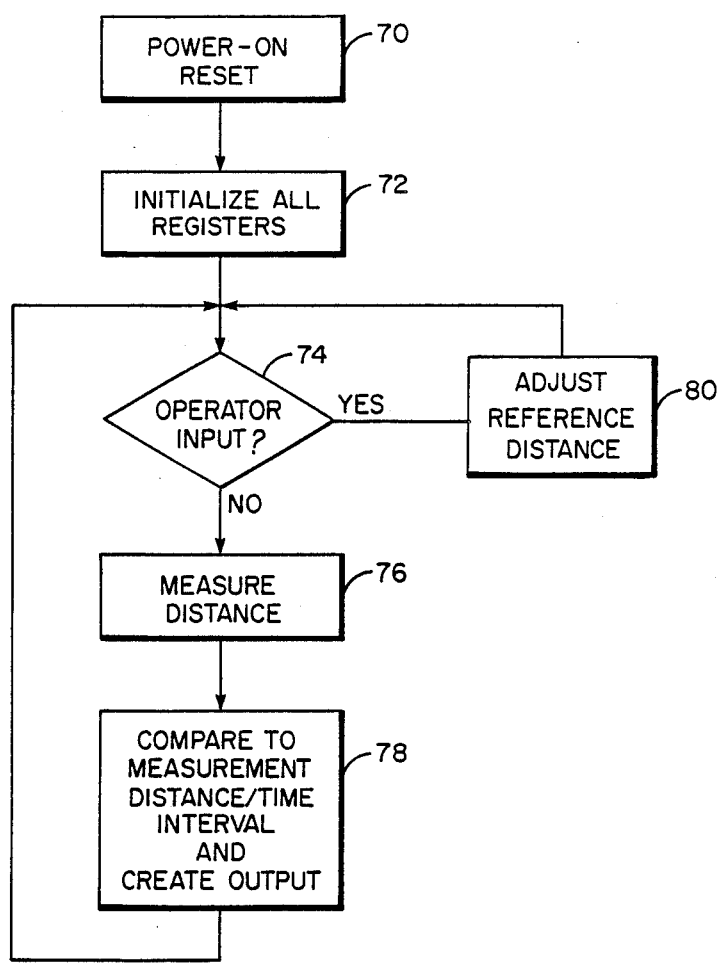
FIG. 5 is a flow chart of operation according to a main routine for the auger and grader controller of the microcomputer of FIG. 4.

Referring to FIG. 5, there is shown the flow chart of the program for both the grading implement 18 and the auger 16. The program for the grading implement 18 and auger 16 may operate similarly; however, there are slight variations within the program steps. The grading implement 18 and auger control program may reside in the same ROM if a switch is available to select the program to run. The auger control program will be described first and the grader control program operation will follow.

In step 70, a power on reset is generated by the hardware of the monitor circuitry 32. The reset pin to the microprocessor 50 is held low until the power supply is stable. Once power is stable, the microprocessor 50 executes step 72.

In step 72, microprocessor 50 is initialized by (1) clearing internal registers, (2) clearing interrupts, (3) setting the outputs to a low state, (4) loading the code from internal ROM (Read Only Memory) to RAM (Random Access Memory), and (5) loading a preset value stored in non-volatile memory into internal RAM. The microprocessor next executes step 74.

In step 74, the microprocessor 50 monitors user interface 56 to determine if an input has been generated by the operator 29 through control panel 31. If data has been transferred to user interface 56, microprocessor 50 executes step 80. If no data has been transferred to user interface 56, microprocessor 50 executes step 76.

In step 76 of the auger control program, microprocessor 50 determines a distance time period 53 corresponding to the time it takes a sonic signal to travel distance 37, the distance from transducer 142 to asphalt 36 by (1) clearing all capture registers in microprocessor 50, (2) setting the capture registers to detect all input signals coming from transducer 142, (3) waiting for the internal 16-bit counter to reach zero, (4) then triggering the ranging circuitry 58 to transmit sonic signal 46 and waiting for input capture registers to be set; these registers are set upon the detection of a reflected sonic signal 51 by transducer 42, and (5) disabling further captures from occurring and reading the value on the 16-bit internal counter when capture registers are set. The distance time period 53 corresponds to the value read from the 16-bit internal counter when the capture register is set. The microprocessor 50 then calculates a running average (mean measurement time period) of the last eight distance time periods 53. The microprocessor next executes step 78.

In step 78, the microprocessor 50 subtracts a value corresponding to the start of a preset time interval 134 from the mean measurement time period to get a resultant value. If the resultant value is negative, the microprocessor 50 clears its outputs connected to auger output interface 54. The resultant value is converted to an analog control signal and is then written to the auger output interface 54. The analog control signal is an analog voltage level corresponding to the velocity auger 16 is to rotate. The analog voltage level ranges from 5-10 volts where the auger 16 rotates at maximum velocity at higher voltage levels. The analog control signal is transmitted to the auger control mechanism (not shown) on line 64.

When the auger 16 turns, the level of asphalt 36 rises and falls, resulting in fluctuations in the auger 16 speed. To avoid these fluctuations, microprocessor 50 averages the distance time period 53 in step 76 and uses the mean measurement period to get the resultant value before transmitting the analog control signal to the auger control mechanism. Accordingly, by transmitting the analog control to auger control mechanism after averaging the distance time period 53, the auger 16 maintains a constant and more accurate speed, thereby preventing asphalt 36 separation. The microprocessor 50 then executes step 74.

In step 80, microprocessor adjusts the start of reference time interval 132 and stores the value corresponding to the preset time period 134 in electrically erasable programmable read only memory (EEPROM) in response the operator activating an up or down user input switch (not shown) located on control panel 31. If the up or down switch is depressed, the start of the reference time interval 132 is incremented or decremented by an amount proportional to the time that the switch was depressed. If the null switch on control panel 31 was toggled, a new distance time period 53 will be computed and then saved as the value corresponding to the start of the reference time interval 132. The microprocessor 50 will then execute step 74.

For the grader control steps 70, 72 and 74, the microprocessor operates as described in connection with the auger control block description. The remaining grader control program blocks operate as follows:

In step 76, the microprocessor 50 determines the measurement distance 35 by first setting the internal microprocessor 50 capture registers to detect the rising edges of pulses from transducer 42, enabling a blanking signal to prevent the microprocessor 50 recognizing the pulse corresponding to sonic signal 49 as the pulse corresponding to first reflected sonic signal 45. The microprocessor 50 then tests for the pulse corresponding to first reflected sonic signal 45. Upon receiving the first reflected sonic signal 45, the microprocessor 50 reads the value (t1) on the 16-bit internal counter and stores the value (t1) in RAM. The microprocessor 50 then prepares the transducer 42 and microprocessor 50 capture register to detect a second reflected sonic signal 39. Upon receiving the second reflected sonic signal 39, the microprocessor 50 disables further captures, records the value (t2) on the 16-bit internal counter, and then calculates the measurement distance (d2) 35, where $d2 = d1 \cdot t2/t1$ where d1 is the predetermined distance 47, where t1 is the value read on the internal 16-bit counter corresponding to the first time period 86 and t2 is the value read on the internal 16-bit counter corresponding to the second time period. The measurement distance (d2) 35 is then stored in an internal register of microprocessor 50. The microprocessor then executes step 78.

In step 78, the microprocessor 50 compares the measurement distance (d2) 35 distance intervals 94, 95, 97 and creates a direction signal if the measurement distance (d2) 35 is within one of these three distance intervals 94, 95 and 97. If the measurement distance 35 is not within distance intervals 94, 95 and 97, the measurement distance (d2) 35 will be ignored. If the measurement distance (d2) 35 falls within the second distance interval 95 or target region, a null lamp (not shown) on operator panel 31 is turned on, indicating that the grading implement 18 is not to change its position. Otherwise, microprocessor 50 generates a direction signal having a pulse with a time duration proportional to the magnitude of the difference between the second distance interval 95 and measurement distance 35 in accordance with FIG. 6.

If measurement distance 35 is within third distance interval 97, a positive direction signal is applied to the up output 60. If a negative direction signal is applied to the down output 62. By having the pulse within the positive direction signal proportional to the magnitude of the difference between the second distance interval 95 and measurement distance (d2) 35, the grading implement 18 is prevented from oscillating into an out of the target range, thereby delivering asphalt to the road bed with minimal ripples. Further, by compensating for temperature of the air, the final height of the asphalt 36 will more closely approximate the height of datum 34. The microprocessor 50 then executes step 74.

In step 80, the microprocessor 50 adjusts the programmable distance 93 (FIG. 7) by first determining if a operator input switch on control panel 31 has been toggled. If an up or down switch was toggled, the programmable distance 93 will be incremented or decremented accordingly. If the null switch on control panel 31 is toggled, the measurement distance 35 is stored into an internal microprocessor 50 register and is substituted for the old programmable distance 93. The microprocessor 50 then updates the programmable distance 93 in RAM and EEPROM and executes step 74.

Referring to FIG. 7, there is shown a timing diagram for the grader control and sensing device. Microprocessor 50 initiates the distance detection process by sending a transmit signal 81 to ranging circuitry 58. Ranging circuitry 58 converts the transmitted sonic signal 49 to a sonic signal 49 which is propagated from transducer 42 to datum 34 and screw 46. The repetition rate of the transmit pulse 81 is approximately 30 hertz.

The sonic signal propagated from transducer 42 contains first and second reflected sonic signals 45 and 39. The first reflected sonic signal 45 is received approximately 0.88 milliseconds after the transmission of sonic signal 49 for screw 44 being disposed 6 inches from transducer 42. The second reflected sonic signal 39 is received at approximately 3.52 milliseconds after transmission of transmitted sonic signal 49 for a datum being disposed 2 feet from transducer 42.

The microprocessor program defines an operating range having three consecutive comparison distance intervals 94, 95, 97. The first of these intervals is the positive or first distance interval 94 having a range of 1 foot, the second is the target or second distance interval 95 having a range of 0.1 inches and the third is the negative or third distance interval 97 having a range of 1 foot. The microprocessor 50 defines the start of the first distance interval 94 at programmable distance 93. The programmable distance 93 shown is 1.0 feet.

As a first example, assume that the time for a sonic signal to travel down and back between transducer 42 and screw 44 is indicated first by reflection time period (t1) 86a and the time period for a sonic signal to travel down and back between transducer 42 and datum 34 is indicated by second reflection time period (t2) 88a. This second reflection time period (t2) 88a is then divided by first reflection time period (t1) 86a, which is then used as a scaler. This scaler then is multiplied by the predetermined distance (d1) 47. The resulting signal is a measurement distance (d2) 35a. As the measurement distance (d2) 35a falls in the third distance interval 97, control circuitry 32 generates a positive direction signal 92 having a pulse width proportional to the distance between measurement distance (d2) 35a and second distance interval 95, in accordance with FIG. 6. This positive direction signal 92 is then transmitted on line 62 to hydraulic cylinder 26 which results in the raising the level of grader implement 18.

In a second example, assume that the time for a sonic signal to travel down and back between transducer 42 and the screw 44 is indicated by first reflection time period (t1) 86b, and the time for a sonic signal to travel down and back between transducer 42 and datum 34 is indicated by second reflection time period (t2) 88b. Accordingly, the predetermined distance (d1) 47 will be scaled by the second reflection time period (t2) 88b divided by the first reflection time period (t1) 86b, resulting in measurement distance (d2) 35b. As the measurement distance (d2) 35b falls in the first distance interval 94, a resulting negative direction signal 104 is generated by microprocessor 50. The negative direction signal occurs after the end of transmit pulse 81 and has a pulse width corresponding to the difference between measurement distance (d2) 35b and second distance interval 95, in accordance with FIG. 6.

In a third example, assume that the time for a sonic signal to travel down and back between transducer 42 and screw 44 is indicated by first reflection time period (t1) 86c and the time for a sonic signal to travel down and back between transducer 42 and screw 44 is indicated by second reflection time period (t2) 88c. Accordingly, the predetermined distance (d1) 47 will be scaled by the second reflection time period (t2) 88c divided by the first reflection time period (t1) 86c resulting in the measurement distance (d2) 35c. As the measurement distance (d2) 35c falls in third distance interval 97, a positive direction signal 112 is generated having a pulse width corresponding to the difference between the measurement distance (d2) 35c and second distance interval 95, in accordance with FIG. 6.

In a fourth example, assume that the time for a sonic signal to travel down and back between transducer 42 and screw 44 is indicated by first reflection time period (t1) 86d and the time for a sonic signal to travel down and back between transducer 42 and datum 34 is indicated by second reflection time period (t2) 88d. Accordingly, the predetermined distance (d1) 47 will be scaled by the second reflection time period (t2) 88d divided by the first reflection time period (t1) 86d resulting in a measurement distance (d2) 35d. As measurement distance (d2) 35d falls within a positive interval 94, a negative direction signal 120 is generated having a pulse width corresponding to the distance between the measurement distance (d2) 35d and the second distance interval 95, in accordance with FIG. 6.

Because of the small difference in distance between the end of the measurement distance (d2) 35d and the start of second distance interval 95 compared to the end of measurement distance (d2) 35c relative to the start of second interval 95, the pulse width of negative direction signal 120 is small compared to the pulse width positive direction signal 112 of example 3. By reducing the duration of the pulse width of the direction signal when the distance between the measurement distance (d2) 35 and second distance interval 95 decreases, the hydraulic cylinder 26 is prevented from oscillating into and out of the target range.

In a fifth example, assume that the time for a sonic signal to travel down and back between transducer 42 and screw 44 is indicated by first reflection time period (t1) 86e and the time for a sonic signal to travel down and back between transducer 42 and datum 34 is indicated by second reflection time period (t2) 88e. Accordingly, the predetermined distance (d1) 47 will be scaled by second reflection time period (t2) 88e divided by the first reflection time period (t1) 86e resulting in a measurement distance (d2) 35e. As the measurement distance (d2) 35e falls within the second distance interval 95, no output pulses are transmitted to the hydraulic cylinder 26.

Figure 8:
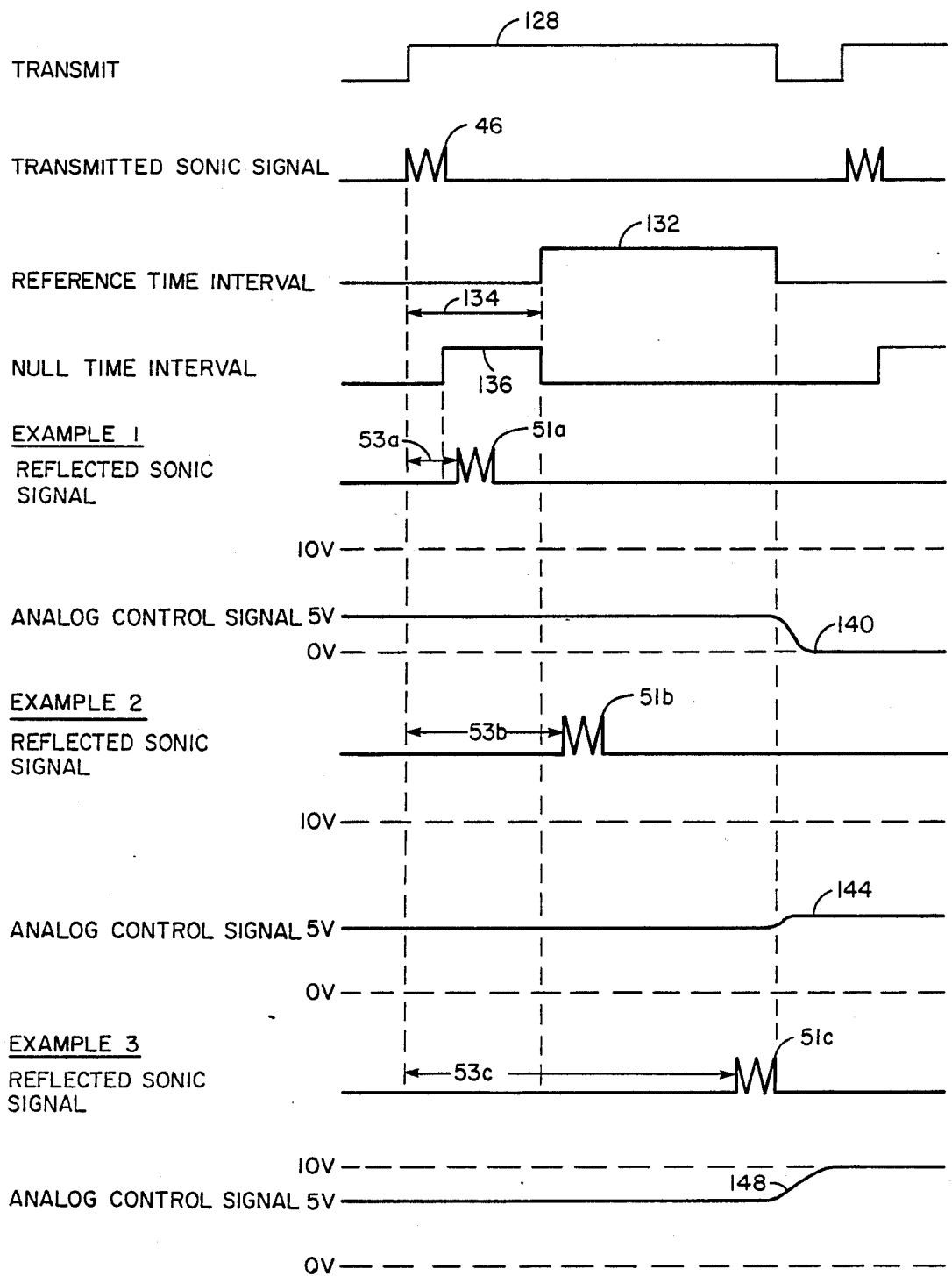
FIG. 8 is a timing diagram for the auger range sensing and control device of FIG. 4.

Referring to FIG. 8, there is shown the timing diagram for the auger 16 control using sonic detector 24. During auger 16 operation, microprocessor 50 transmits a transmit pulse 128 to ranging circuitry 58 which transmits sonic signal 46 to transducer 142. Transducer 142 then transmits the sonic signal 46 toward a first location on the asphalt 36. The reflected sonic signal 51 is then reflected from the first location back to transducer 142 and transmitted to control circuitry 32. Microprocessor 50 then calculates a mean measurement time period corresponding to the average of the last eight distance time periods 53. It is noted that eight distance time periods are specified; however, more or less distance time periods may be used to calculate the mean measurement time period. The auger 16 is then rotated at a velocity proportionate to the difference between the preset time interval 134 and the mean measurement time period.

Upon initialization of control circuitry 32, microprocessor 50 defines a reference time interval 132 and null time interval 136. The reference time interval 132 begins at a preset time period 134 after transmit signal 128 begins. Null time interval 136 ends prior to preset time interval 132 beginning. The reference time interval 134 corresponds to a reflection time period wherein the asphalt 36 is lower than the preset level 33 and indicates auger 16 is to be rotated. The null time interval 136 corresponds to a reflection time period wherein the asphalt 36 is higher than the preset level 33 and the auger 16 is not to be rotated.

As a first example, assume that the height of the asphalt 36 is above the preset level 33. A reflected sonic signal 51a is received during the null time interval 136. Microprocessor 50 detects the rising edge of reflected sonic signal 51a, calculates a mean measurement time period from the average of distance time period 53a, and then generates a low voltage analog control signal 140 through auger output interface 54. This analog control signal 140 is transmitted on control line 64 to an auger control mechanism. Analog control signal 140 is transmitted at a zero level to auger control mechanism which stops the rotation of the auger 16.

In a second example, assume that the separation distance between auger sonic sensor 24 and asphalt 36 falls below the preset reference level 33. Accordingly, the reflected sonic signals 51b occur during the reference time interval 132. The microprocessor 50 then detects this reflected sonic signal 51b, calculates a mean measurement time period, and transmits analog control signal 144 to control line 64 having a level of approximately 7 volts. This analog control signal 144 is transmitted to auger control mechanism which results in auger 16 continuing to turn at a relatively small rotational velocity, thereby moving asphalt 36 from the center of paving machine 10 to the outer edges of the road bed 38.

In a third example, assume that the height of asphalt 36 is relatively low to the ground and below the preset reference level 33. Accordingly, reflected sonic signals 51c occur during reference time interval 132. As the reflected sonic signals 51c fall on the latter part of reference time interval 132, the mean measurement time period is calculated which results in analog control signal 148 on control line 64 being transmitted to auger control mechanism at a level near maximum voltage, shown at approximately 10 volts. Accordingly, the auger 16 rotates at its maximum rotational velocity.

By using the sonic sensor 24 to detect the asphalt 36 profile, the auger 16 maintains an even distribution of asphalt 36 to the road bed 38. Second, the sonic sensor 24 will not clog up with asphalt 36. Third, the sonic sensor 24 and associated control circuitry causes the auger 16 to instantaneously respond to changes in the height of the asphalt 36 deposited on the road bed 38, thereby providing a more stable auger rotational velocity and preventing asphalt separation.

Figure 9:
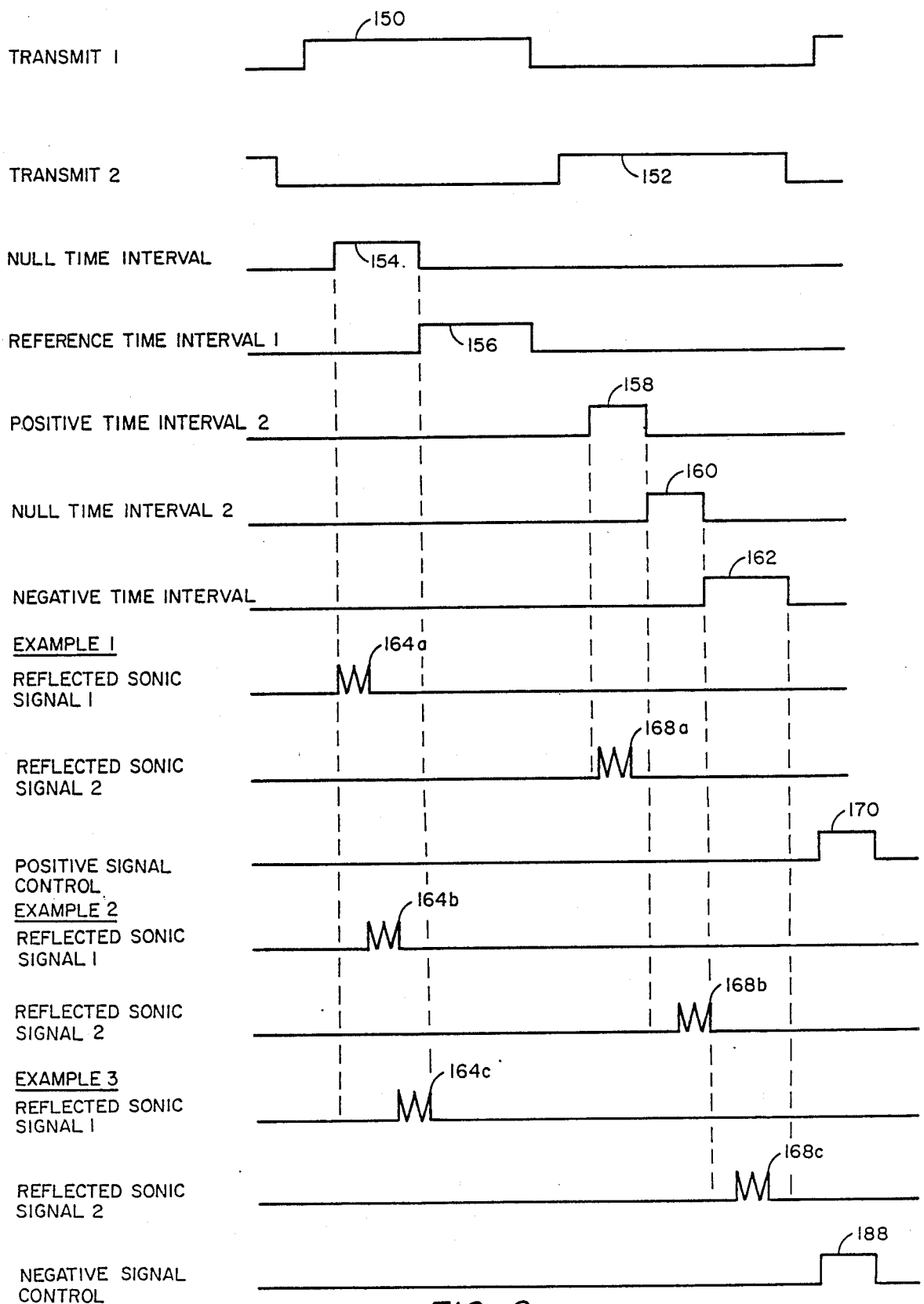
FIG. 9 is a timing diagram for the hopper range sensing and control device of FIG. 4.
Figure 10A:
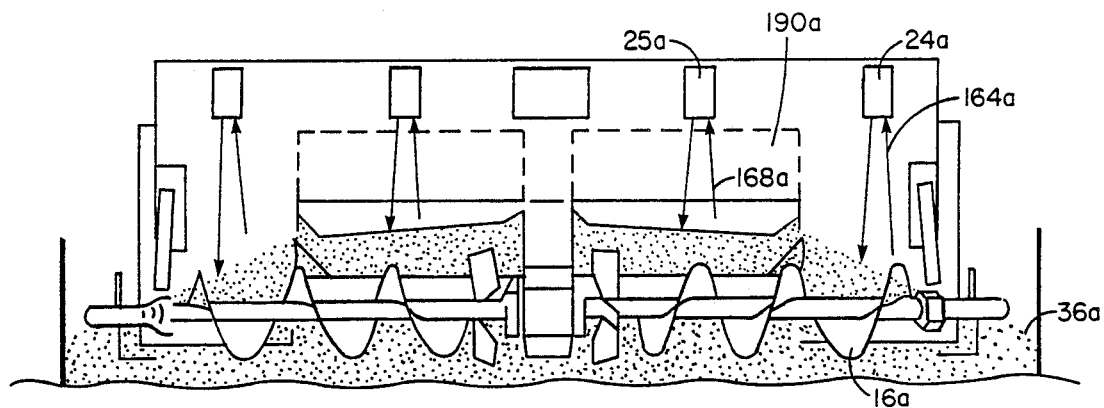
FIGS. 10A through 10C are rear views of the auger showing the material profile as a function of the gate height to material feed.
Figure 10B:
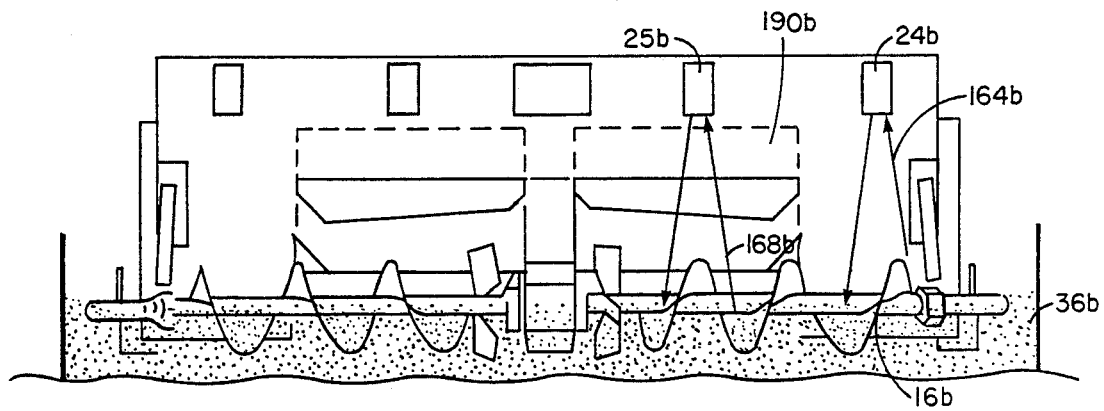
Figure 10C:
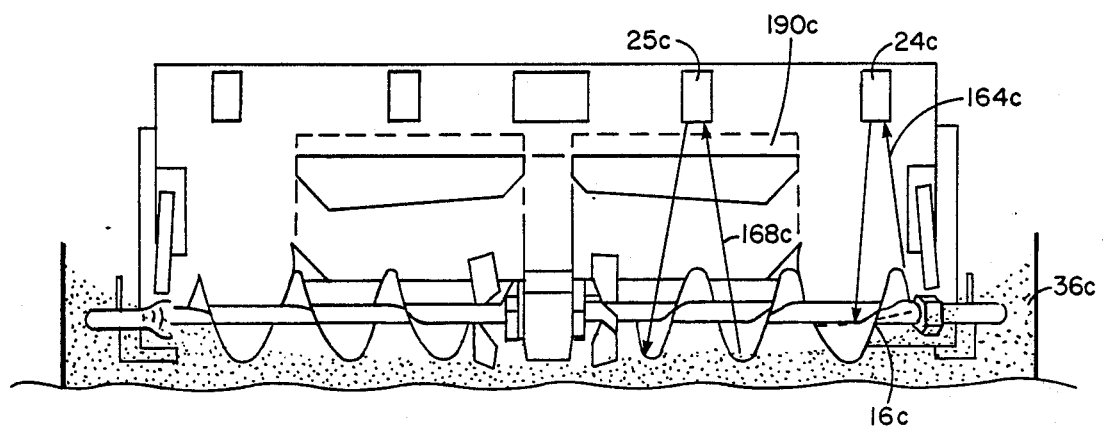

Referring to FIG. 9, there is shown the timing diagram for the hopper gate control using dual sonic detectors 24 and 25, as shown in FIGS. 10A-10C. When two sonic detectors 24 and 25, as used to detect asphalt 36 height, a first sonic signal 150 is sent to auger sonic sensor 24 and a second sonic signal 152 is transmitted to auger sonic sensor 25. The control circuitry 32 for auger sonic sensor 24 defines a null time interval 154 and a reference time interval 156, as was defined with single auger sonic sensor 24 in FIG. 8. However, when using dual sonic sensors 24 and 25, the circuitry associated with auger sonic sensor 25 defines a positive time interval 158, null time interval 160, and negative time interval 162. If a reflected sonic signal 164(a-c) is received from sonic sensor 24 during the reference time interval 156, the speed of the auger 16 is changed, as described in FIG. 8. If a reflected sonic signal 164(a-c) from auger sonic sensor 24 occurs during the null time interval 154, the height of the gate 190(a-c) changes corresponding to the time interval that the reflected sonic signal 168(a-c) from sensor 25 occurs.

Assume that gate 190a is too high, as shown in FIG. 10A and that the auger 16a is rotating at the correct speed. Reflected sonic signal 164a from auger sonic sensor 24a will occur during the null time interval 154 (FIG. 9), and the reflected sonic signal 168a will occur during positive time interval 158. Microprocessor 50 detects the reflected sonic signals 164a and 168a, and then determines that reflected sonic signal 164a ends during null time interval 154 and reflected sonic signal 168a ends during positive time interval 158. Microprocessor 50 then transmits a positive gate control signal 170 to a hopper gate height control valve (not shown) through hopper output interface 174 which results in hopper gate 190a being lowered.

Assume that the hopper gate 190b position is correct, as shown in FIG. 10B. Accordingly, the reflected sonic signal 164b from sonic sensor 24b occurs during the null time interval 154, and the reflected sonic signal 168b from sonic sensor 25b occurs during the null time interval 160. Microprocessor 50 samples the reflected sonic signal 164b and reflected sonic signal 168b to determine if the reflected sonic signal 164b falls in null time interval 154 and reflected sonic signal 168b falls in null time interval 160. As the material profile indicates that the gate 190b position is correct, no gate control pulses will be generated.

In a third example, assume that gate 190c position is too low, as shown in FIG. 10C. Accordingly, the reflected sonic signal 164c from auger sonic sensor 24c occurs during the null time interval 154, and the reflected sonic signal 168c from auger sonic sensor 25c occurs during the negative time interval 162. When microprocessor 50 detects these sonic signals, via ranging circuitry 58, and determines which time interval reflected sonic signals 164c and 168c occur, a negative gate control pulse 188 is transmitted to the hopper gate controller via hopper output interface 172 and line 176. Accordingly, the height of the hopper gate 190c is raised. By using sonic sensor 24 and 25 with control circuitry 32, a correct height of the hopper gate 190c is maintained.

Figure 11:
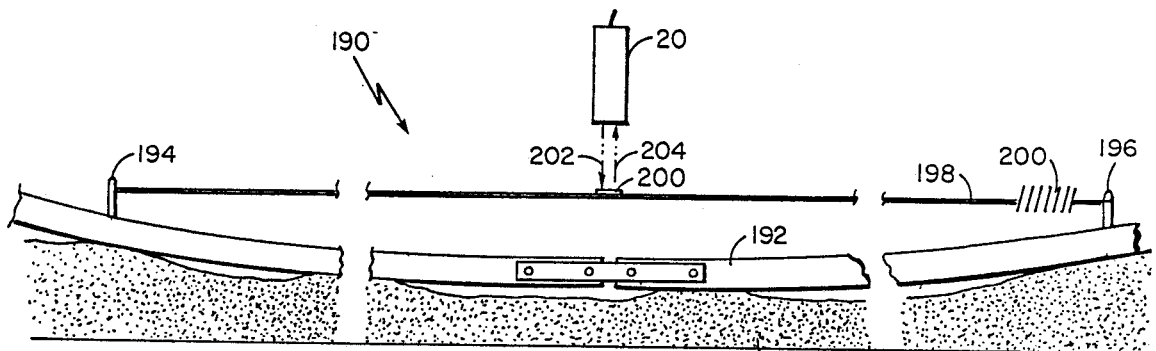
FIG. 11 shows a perspective view of the screed sonic sensor shown in FIG. 1 operating with a ski.

Referring to FIG. 11, there is shown an embodiment of the sonic sensor 20 operating with a ski 190. The ski 190 contains a base part 192, having two posts 194 and 196, with a string line 198 connected to a spring 200 between posts 194 and 196. Mounted in the center of string line 198 is a reflector 200.

During operation, the ski 190 is dragged along the side of paving machine 10. The ski averages the bumps and crevaces along the curb or datum 34. The string line 198 maintains an average curb height.

As the ski 190 is dragged along the side of the road bed, sonic sensor 20 transmits sonic signal 202 and receives a reflected sonic signal 204 from reflector 200. The reflected sonic signal 204 is then transmitted to control circuitry 32 which changes the height of the grading implement 18 relative to the height of string line 198. By using ski 190, the road bed 38 maintains an even distribution of asphalt which results in a smoother surface. Further, the sonic sensor does not require any moving parts. Accordingly, by using a sonic sensor 20 rather than a wand, the reliability of the system is increased.

Having described preferred embodiments of this invention, it is now evident that other embodiments incorporating these concepts may be used. In particular, the sonic sensor may be replaced with optic or laser sensors. Further compensation for temperature along with the prevention of overshoot, as described for use with the grader, may be similarly used with the auger to provide a more accurate rotational velocity. It is felt, therefore, that this invention should not be restricted to the disclosed embodiments, but should be limited only by the spirit and scope of the appended claims.

What is claimed is:

1. An asphalt paver comprising: an auger for moving asphalt laterally in a direction perpendicular to the direction of said paver;

sonic means coupled to said paver for periodically transmitting a sonic signal downwardly towards a first location on said asphalt in said auger and for receiving a reflection of said sonic signal from said first location on said asphalt;

means for measuring the time period between transmitting and receiving said sonic signal, said measured time period corresponding to the distance from said sonic means to said asphalt; and means responsive to said measuring means for driving said auger so as to provide a predetermined level of asphalt within said auger, said driving means comprising means for reducing angular acceleration of said auger so as to inhibit asphalt separation, said reducing means comprising means for determining a mean time period of a plurality of immediately preceeding measured time periods and for controlling the angular velocity of said auger in accordance with said mean time period.

2. The apparatus as recited in claim 1 further comprising means for defining a present time interval corresponding to the time period between transmitting and receiving said sonic signal when said asphalt is at a preset level.

3. The apparatus as recited in claim 2 wherein said reducing means increases said angular velocity of said auger as said mean time period decreases and decreases said angular velocity of said auger as said mean time period increases.

4. The apparatus as recited in claim 1 wherein said auger has a variable rotational velocity.

5. The apparatus as recited in claim 1 wherein said sonic means comprises an ultrasonic transducer and associated ranging circuitry.

6. An asphalt paver comprising:
an auger for moving asphalt laterally in a direction perpendicular to the direction of said paver;
sonic means coupled to said paver for periodically transmitting a sonic signal downwardly towards a first location on said asphalt in said auger and for receiving a reflection of said sonic signal from said first location on said asphalt;
means for measuring the time period between transmitting and receiving said sonic signal, said measured time period corresponding to the distance from said sonic means to said asphalt;
means for determining a mean time period corresponding to the average of a plurality of measured time periods;
means responsive to said mean time period for varying the rotational speed of said auger;
means for generating a hopper adjustment signal related to the magnitude of the difference between said measured time period and said second measured time period; and
means responsive to said hopper adjustment signal for adjusting the height of a hopper located on said paving machine.

7. An asphalt paver comprising:
an auger for moving asphalt laterally in a direction perpendicular to the direction of said paver;
sonic means coupled to said paver for periodically transmitting a first sonic signal downwardly towards a first location on said asphalt in said auger, for receiving a reflection of said first sonic signal from said first location on said asphalt, for periodically transmitting a second sonic signal towards a second location adjacent said first location on said asphalt and for receiving a second sonic signal reflected upward from said second location, wherein the time period between transmission and receipt of said second sonic signal defines a second measured time period that is proportional to the separation distance between said sonic means and said second location on said asphalt;
means for measuring the time period between transmitting and receiving said first sonic signal, said measured time period corresponding to the distance from said sonic means to said asphalt;
means for determining a mean time period corresponding to the average of a plurality of measured time periods; and
means responsive to said mean time period for varying the rotational speed of said auger.

8. An apparatus for controlling the rotational velocity of an auger of an asphalt paving machine relative to the height of the asphalt in the auger, said apparatus comprising:
sonic means coupled to said paving machine for periodically transmitting a sonic signal downwardly toward said asphalt and for receiving a sonic signal reflected upwardly from said asphalt, wherein the time period between transmission and receipt of said sonic signal defines a distance time period that is proportional to the separation distance between said sonic means and said asphalt;
means responsive to said distance time period for driving said auger so as to provide a predetermined level of asphalt within said auger, said driving means comprising auger rotational adjustment means for reducing angular acceleration of said auger so as to inhibit asphalt separation, said reducing means comprising:
 (a) means for determining a mean time period of a plurality of immediately preceeding distance time periods;
 (b) timing means for periodically defining a consecutive first and second time interval of finite duration, wherein said first time interval defines a halt region beginning at a time after said transmission of said sonic signal by said sonic means and said second time interval defines a positive region beginning after said first time interval;
 (c) comparison means for generating a distance signal if said mean time period ends during said second time interval wherein said distance signal has a predetermined relationship to the magnitude of said mean time period, and for generating a halt signal if said mean time period ends during said first time interval; and
 (d) auger rotational adjustment means coupled to said auger for rotating said auger at an angular velocity having a predetermined relationship to said distance signal and for decreasing said angular velocity of said auger in response to said halt signal.

9. The apparatus as recited in claim 8 further comprising means for changing the beginning time of said second time interval.

10. The apparatus as recited in claim 8 wherein said sonic signal is transmitted at ultrasonic frequencies.

11. The apparatus as recited in claim 8 wherein said distance signal has a voltage level proportional to the magnitude of said mean time period.

12. The apparatus as recited in claim 11 wherein said halt signal has a voltage level outside the voltage range of said distance signal.

13. The apparatus as recited in claim 8 further comprising means for remotely changing said predetermined relationship between the auger rotation rate and the asphalt height.

14. The apparatus as recited in claim 13 further comprising means for storing said predetermined relationship in a data storage element.

15. An apparatus for controlling the rate of flow of asphalt of a paving machine relative to the height that the delivered asphalt's level extends above a preset level located above the ground, said apparatus comprising:

sonic means coupled to said implement for periodically transmitting a first and second sonic signal downward toward a respective first and second location positioned on said asphalt, and for receiving a first and second sonic signal reflected upward from said asphalt, wherein the time period between transmission and receipt of said first sonic signal defines a first distance time period that is proportional to the separation distance between said sonic means and said first location, and wherein the time period between transmission and receipt of said second sonic signal defines a second distance time period that is proportional to the separation distance between said sonic means and said second location;

means for defining a preset time period corresponding to the time period between transmission and receipt of a sonic signal when said asphalt level is equal to said preset level;

means for generating no flow signals if the magnitude of the difference between said first and second distance time period is less than a preset time period, for generating a positive flow signal if the magnitude of the difference between said first and second distance time period is positive and has a magnitude greater than said preset time period, and for generating a negative flow signal if the magnitude of the difference between said first and second time period is negative and has a magnitude greater than said preset time period; and delivery rate adjustment means coupled to said asphalt paving machine for increasing the amount of asphalt flow in response to a positive flow signal and for decreasing the amount of asphalt flow in response to said negative flow signal.

16. The apparatus as recited in claim 15 wherein said first location is disposed adjacent said second location, said first and second locations are positioned on a plane intersecting said asphalt and perpendicular to the direction of travel of said asphalt paving machine.

17. The apparatus as recited in claim 15 wherein said delivery rate adjustment means increases said asphalt flow by raising a hopper gate attached to said paving machine and decreases said asphalt flow by lowering said hopper gate.

18. An apparatus for controlling the position of a grading implement relative to a datum alongside a roadbed comprising:

sonic means coupled to said grading implement for transmitting a sonic signal downward toward the datum and receiving said sonic signal reflected upward from said datum, wherein the duration of a time period between transmission and receipt of said sonic signal defines a distance time period that is proportional to the distance between said sonic means and said datum;

means in electrical contact with said sonic means for generating a direction signal relative to said distance;

means for moving said position of said grading implement in response to said direction signal; and reference point means disposed a predetermined distance downward from said sonic means for reflecting a portion of said sonic signal from said sonic transmitting means to said sonic receiving means, wherein the time duration between transmission and receipt of said sonic signal from said reference point defines a first time period, wherein the time duration between transmission and receipt of said sonic signal from said datum defines a second time period and wherein said reference point means protrudes into the region between said sonic transmit means and said datum such that any reflection of said signals from said reference point means is distinguishable from the reflection of said sonic signal from said datum.

19. An apparatus for controlling the position of a grading implement of a paving machine at a predetermined distance above a datum disposed alongside a roadbed, said apparatus comprising:

sonic means coupled to said grading implement for periodically transmitting a sonic signal downward toward said datum and receiving a sonic signal reflected upward from said datum, wherein the duration of a time period between transmission and receipt of said sonic signal defines a second time period that is proportional to the distance between said sonic means and said datum;

reference point means disposed a predetermined fixed distance downward from said sonic means for reflecting said sonic signal from said sonic transmitting means to said sonic receiving means;

timing means for defining an first time period between transmission and receipt of said sonic signal from said reference point means;

adjustment means for determining a measurement distance corresponding to the distance between said sonic means and said datum, calculated by a predetermined relationship between said first time period, said predetermined distance and said second time period;

comparison means for generating a direction signal if the duration of said measurement distance falls within a predetermined distance interval; and position adjustment means coupled to said grading implement for moving said implement relative to the ground in response to said direction signal in such a manner as to slow the movement of said grading implement, thereby preventing ripples in said roadbed.

20. The apparatus as recited in claim 19 wherein said sonic means is integrally connected to said grading implement.

21. The apparatus as recited in claim 19 wherein said sonic means transmit said sonic signal at ultrasonic frequencies.

22. The apparatus as recited in claim 19 wherein said reflection from said reference point means is a single reflected sonic signal to distinguish the reference point means reflected from the datum reflection.

23. The apparatus as recited in claim 19 wherein said predetermined relationship equals ((first time period)*-(said predetermined distance))/(second time period).

24. An apparatus for controlling the position of a grading implement at a predetermined distance above a datum disposed adjacent a road bed, said apparatus comprising:
- sonic means coupled to said grading implement for transmitting a sonic signal downward toward the datum and receiving said sonic signal reflected upward from the datum;
- means in electrical contact with said sonic means and responsive to said reflected sonic signal for generating a direction signal relative to said distance;
- means for moving the position of said grading implement in response to said direction signal; and
- a casing having a cavity through which said sonic signal is transmitted before being reflected upward from said datum, said cavity being formed within said casing to focus said sonic signal at a target location on said datum to reduce reflections from non-target locations on said datum to provide a reflected signal that is used to accurately position said grading implement.

25. The apparatus as recited in claim 24 further comprising reference means protruding into said cavity a predetermined distance from said transmitting means for reflecting said sonic signal from said sonic transmitting means to said sonic receiving means, wherein said reference means protrudes into said cavity such that any reflection of said sonic signal from said reference point means is distinguishable from the reflection from the datum.

26. An asphalt paver comprising:
- an auger having an auger velocity and moving asphalt laterally in a direction perpendicular to the direction of said paver;
- sonic means coupled to said power for transmitting a sonic signal toward the laterally moving asphalt and receiving said sonic signal reflected upward from the asphalt;
- means responsive to said reflected sonic signal for varying the angular velocity of said auger; and
- a casing having a cavity through which said sonic signal travels before being reflected upward from said asphalt, said cavity being formed within said casing to focus said sonic signal at a target location in said asphalt to reduce reflections from non-target locations in said asphalt and to provide a reflected sonic signal to said varying means to accurately vary the auger velocity.

27. An asphalt paver comprising:
- an auger having an angular velocity for moving asphalt laterally in a direction perpendicular to the direction of said paver;
- first sonic means coupled to said paver for periodically transmitting a first sonic signal downwardly towards a first location on said asphalt in said auger, for receiving a refection of said first sonic signal from said first location on said asphalt, wherein the time period between transmitting and receiving said first sonic signal defines a first measured time period that is proportional to the distance between said first sonic means and said first location on the asphalt;
- second sonic means for periodically transmitting a second sonic signal towards a second location adjacent said first location on said asphalt and for receiving a second sonic signal reflected upward from said second location, wherein the time period between transmission and receipt of said second sonic signal defines a second measured time period that is proportional to the separation distance between said second sonic means and said second location on said asphalt; and
- means responsive to said first measured time period for varying the angular velocity of said auger.

28. The apparatus as recited in claim 27 further comprising means for generating a hopper adjustment signal related to the magnitude of the difference between said first measured time period and said second measured time period; and means responsive to said hopper adjustment signal for adjusting the height of a hopper located on said paving machine.

29. An asphalt paver comprising:
- an auger for moving asphalt laterally in a direction perpendicular to the direction of said paver;
- means for periodically measuring the height of said asphalt adjacent said auger; and
- means for reducing angular acceleration of said auger so as to inhibit asphalt separation, said reducing means comprising means for determining a means asphalt height of a plurality of immediately preceeding measurements, and means for controlling the auger angular velocity in accordance with said mean measurement.

30. An asphalt paver comprising:
- an auger for moving asphalt laterally in a direction perpendicular to the direction of said paver;
- means for periodically measuring the level of said asphalt adjacent said auger;
- means for providing a control signal when the level of said asphalt falls below a first preset level;
- control panel means for indicating that said control signal is to be provided when the level of said asphalt falls below a second preset level;
- means responsive to said control panel means indication for providing said control signal when the level of said asphalt falls below said second preset level; and
- auger rotational adjustment means coupled to said auger for rotating said auger at an angular velocity having a predetermined relationship to said control signal.

31. The paver as recited in claim 30 further comprising:
- means for providing a second control signal when the level of said asphalt exceeds said first preset level;
- control panel means for indicating that said second control signal is to be provided when the level of said asphalt exceeds said second preset level; and
- means responsive to said control panel indicator for providing said second control signal when the level of said asphalt exceeds said second preset level.

32. The paver as recited in claim 31 further comprising:
- means for providing no control signal when the level of said asphalt approximately equals said first preset level; and
- means responsive to said control panel indicator for providing no control signals when the level of said asphalt approximately equals said second preset level.

33. An apparatus for controlling the position of a grading implement relative to a datum alongside a roadbed comprising:

means for periodically determining the distance between said grading implement and said roadbed;

means for providing a direction signal when the distance between said implement and said roadbed is less than a first predetermined distance;

control panel means for indicating that said direction signal is to be provided when the distance between said grading implement is less than a second predetermined distance;

means responsive to said control panel indicator for providing said direction signal when the distance between said asphalt and said grading implement is less than said second predetermined distance; and means for moving said grading implement relative to the ground in response to said direction signal.

34. The paver as recited in claim 33 further comprising:

means for providing a second direction signal when the distance between said grading implement and said roadbed exceeds said first predetermined distance;

control panel means for indicating that said second direction signal is to be provided when the distance between said grading implement and said roadbed exceeds said second predetermined distance; and means responsive to said control panel indicator for providing said second direction signal when the distance between said grading implement and said roadbed exceeds said second predetermined distance.

35. The paver as recited in claim 34 further comprising:

means for providing no direction signals when the distance between said grading element and said roadbed approximately equals said first predetermined distance; and means responsive to said control panel indicator for providing no direction signals when the distance between said grading implement and said roadbed approximately equals said second predetermined distance.

* * * * *